United States Patent
Ngair

(10) Patent No.: US 9,491,193 B2
(45) Date of Patent: Nov. 8, 2016

(54) SYSTEM AND METHOD FOR ANTIVIRUS PROTECTION

(71) Applicant: Teow Hin Ngair, Singapore (SG)

(72) Inventor: Teow Hin Ngair, Singapore (SG)

(73) Assignee: SECUREAGE TECHNOLOGY, INC., West Chester, PA (US)

( * ) Notice: Subject to any disclaimer, the term of this patent is extended or adjusted under 35 U.S.C. 154(b) by 169 days.

(21) Appl. No.: 13/929,681

(22) Filed: Jun. 27, 2013

(65) Prior Publication Data

US 2015/0007324 A1 Jan. 1, 2015

(51) Int. Cl.
*H04L 29/06* (2006.01)
*H04W 12/12* (2009.01)

(52) U.S. Cl.
CPC ......... *H04L 63/145* (2013.01); *H04L 63/1433* (2013.01); *H04W 12/12* (2013.01)

(58) Field of Classification Search
CPC .................................................. H04L 63/145
USPC .......................................................... 726/24
See application file for complete search history.

(56) References Cited

U.S. PATENT DOCUMENTS

| | | | | |
|---|---|---|---|---|
| 5,960,170 A * | 9/1999 | Chen | ............... | G06F 21/564 714/26 |
| 6,119,165 A * | 9/2000 | Li | ................ | H04L 29/06 709/218 |
| 6,347,375 B1 * | 2/2002 | Reinert | ............... | G06F 21/568 726/24 |
| 6,615,264 B1 * | 9/2003 | Stoltz | ................ | G06F 21/31 709/225 |
| 7,107,618 B1 * | 9/2006 | Gordon | ............... | G06F 21/56 709/206 |
| 7,302,706 B1 * | 11/2007 | Hicks | ................ | G06F 21/562 726/24 |
| 7,854,006 B1 | 12/2010 | Andruss et al. | | |
| 8,127,358 B1 * | 2/2012 | Lee | ............................... | 726/24 |
| 8,201,255 B1 * | 6/2012 | Nachenberg | ....................... | 726/24 |
| 8,230,510 B1 * | 7/2012 | Yang et al. | ........................ | 726/24 |
| 8,302,193 B1 * | 10/2012 | Gardner et al. | ................ | 726/24 |
| 8,813,222 B1 * | 8/2014 | Codreanu et al. | .............. | 726/22 |
| 8,869,284 B1 * | 10/2014 | Mao | ............................... | 726/24 |
| 8,875,294 B2 * | 10/2014 | Golavanov | ........... | G06F 21/564 726/22 |
| 8,914,406 B1 * | 12/2014 | Haugsnes | ........... | H04L 63/1441 382/305 |
| 8,925,088 B1 * | 12/2014 | Wilhelm | ................ | G06F 21/00 726/24 |
| 9,021,590 B2 * | 4/2015 | Herley et al. | ................... | 726/24 |

(Continued)

OTHER PUBLICATIONS

Jakobsson, M., et al, 'Server-Side Detection of Malware Infection', 2010 ACM 978-1-60558-845-2/09/09, NSPW'09, entire document, http://nspw.org/papers/2009/nspw2009-jakobsson.pdf.*

(Continued)

*Primary Examiner* — Luu Pham
*Assistant Examiner* — Ronald Baum
(74) *Attorney, Agent, or Firm* — North Weber & Baugh LLP

(57) ABSTRACT

The present invention relates to antivirus protection and more particularly to antivirus protection in a cloud server. The present invention protects a user machine from a virus while allowing the user to get the benefit of using multiple antivirus options without the need to run the antivirus options on the user machine.

17 Claims, 4 Drawing Sheets

(56) References Cited

U.S. PATENT DOCUMENTS

| | | | |
|---|---|---|---|
| 2001/0005889 A1* | 6/2001 | Albrecht | G06F 21/56 726/24 |
| 2002/0199116 A1 | 12/2002 | Hoene et al. | |
| 2004/0158741 A1* | 8/2004 | Schneider | 713/201 |
| 2004/0193918 A1* | 9/2004 | Green et al. | 713/201 |
| 2005/0138426 A1* | 6/2005 | Styslinger | 713/201 |
| 2007/0220602 A1* | 9/2007 | Ricks et al. | 726/22 |
| 2008/0077991 A1* | 3/2008 | Wallman | H04L 63/145 726/24 |
| 2008/0256636 A1* | 10/2008 | Gassoway | 726/24 |
| 2009/0241192 A1* | 9/2009 | Thomas | G06F 21/577 726/23 |
| 2009/0254993 A1* | 10/2009 | Leone | 726/25 |
| 2009/0287653 A1* | 11/2009 | Bennett | H04L 63/145 |
| 2010/0005291 A1* | 1/2010 | Hulten | G06F 21/56 713/156 |
| 2010/0050249 A1* | 2/2010 | Newman | 726/15 |
| 2010/0083381 A1 | 4/2010 | Khosravi et al. | |
| 2010/0306849 A1 | 12/2010 | Zheng et al. | |
| 2011/0047597 A1* | 2/2011 | Mahaffey et al. | 726/3 |
| 2011/0185428 A1* | 7/2011 | Sallam | 726/24 |
| 2012/0072968 A1* | 3/2012 | Wysopal et al. | 726/1 |
| 2012/0110667 A1* | 5/2012 | Zubrilin et al. | 726/24 |
| 2012/0174225 A1* | 7/2012 | Shyamsunder | G06F 21/566 726/24 |
| 2012/0272321 A1 | 10/2012 | Chou | |
| 2013/0019306 A1* | 1/2013 | Lagar-Cavilla et al. | 726/22 |
| 2013/0031224 A1* | 1/2013 | Nachtrab | G06F 21/6218 709/220 |
| 2013/0111547 A1* | 5/2013 | Kraemer | 726/1 |
| 2014/0013434 A1* | 1/2014 | Ranum et al. | 726/24 |
| 2014/0130161 A1* | 5/2014 | Golovanov | G06F 21/564 726/23 |
| 2014/0283065 A1* | 9/2014 | Teddy et al. | 726/23 |

OTHER PUBLICATIONS

Zhao, B., et al, 'Mirroring smartphones for good: A feasibility study', 2010, ICST Institute for Computer Science, Social Informatics and Telecommunications Engineering, entire document, http://www.cse.psu.edu/~bzhao/mirror_report.pdf.*

International Search Report dated Oct. 15, 2014, in corresponding International Patent Application No. PCT/US2014/043673 (2pgs).

Written Opinion dated Oct. 15, 2014, in corresponding International Patent Application No. PCT/US2014/043673 (5pgs).

* cited by examiner

SYSTEM AND METHOD FOR ANTIVIRUS PROTECTION

BACKGROUND

A. Technical Field

This invention relates generally to antivirus protection and more particularly to antivirus protection via a cloud server.

B. Background of the Invention

There are many antivirus software options currently available. However, the current antivirus options are insufficient. All the currently available antivirus options run directly on a user computer. Therefore, suffering from various disadvantages.

For example, a user can only run one antivirus option at a time because the various antivirus options cannot be run simultaneously. Some antivirus options are better than others at detecting certain types of viruses so it can be advantageous to run more than one antivirus solution. Furthermore, each antivirus option has an associated license fee.

Also, the process of adding viruses to the list of known viruses to be caught by an antivirus option can be a lengthy one. In some cases it can take up to 90 days for a new virus to be added to a list of known virus for antivirus software to detect it.

Another disadvantage of antivirus options is that they run on the user's computer. Therefore using computing resources and memory on the user's computer.

In summary, what is needed is an antivirus solution that gains the benefit of more than one antivirus option with the ability to detect new viruses quickly, without paying multiple license fees or using a user's computing resources.

SUMMARY OF THE INVENTION

Embodiments of the present invention protect a user machine from viruses by using antivirus options simultaneously and remotely. Using multiple antivirus options provides more effective virus detection since some antivirus options are better at detecting one virus and others are better at detecting other viruses. However, multiple antivirus options cannot typically be run on the user's machine. The antivirus options typically interfere with each other and do not work together. Also, they are expensive and have large costs associated with them. Furthermore, running many antivirus options simultaneously would require a lot of computing power and would take too much of the computing resources in a user's machine.

Embodiments of the present invention overcome the above limitations by running antivirus options in the cloud or remotely to the user machine with a light weight antivirus running on the user machine. Running the antivirus options in the cloud permits the options to be run on multiple machines to overcome the limitations described above.

Embodiments of the present invention use a databases of hashes to determine whether a particular file or application resides on a particular user's machine. Therefore, the cloud does not require direct access to a user's machine, but only access to the hash's that are on the user's machine.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
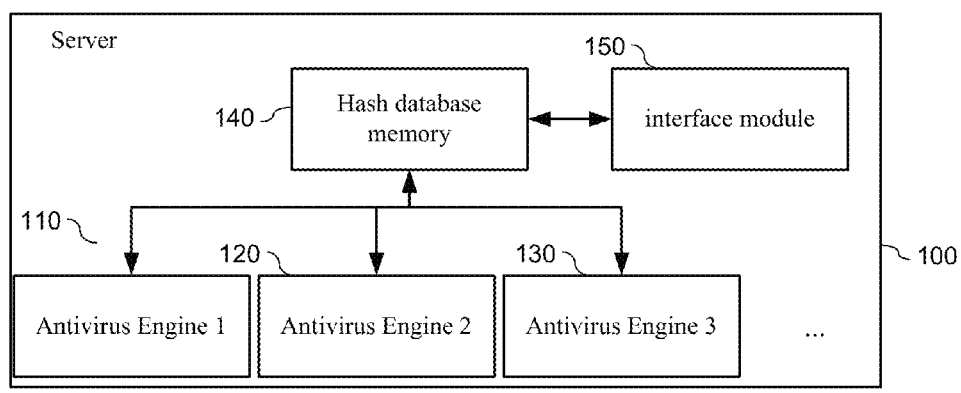
FIG. 1 shows a block diagram of an antivirus system, in accordance with various aspects of the present invention.

FIG. 1 shows a block diagram of an antivirus system, in accordance with various aspects of the present invention. FIG. 1 shows server 100. Server 100 can be implemented using one or more computers. Server 100 includes a non-transitory memory containing a database of hashes and corresponding applications 140. A hash is a unique fingerprint used in antivirus options. Each program has a unique hash. For example, Microsoft Word has a specific hash. An earlier version of word has a different hash and Microsoft Excel has a different hash. Furthermore, a hash can be stored without using a lot of memory space. The hash database 140 is a list of hashes, associated applications and associated user machines.

FIG. 1 also shows interface module 150. Interface module 150 communicates with the user machine. Interface 150 provides information from the user machine to the server 100, as described more fully below in conjunction with FIG. 2. Interface module 150 also provides information to the user machine, for example, the status of whether a virus was detected. Interface module 150 can also send a recommended course of action to the user machine.

The hash database 140 used in conjunction with server 100 including storage of all applications on a user machine permits embodiments of the present invention to scan the applications on the user machine remotely using antivirus engine 1 110, antivirus engine 2 120, and antivirus engine 3130, etc. The remote scanning can be repeated scanning using continuously updated engine and virus definition. As will be understood by one of skill in the art, repeated scanning refers to automatically rescanning files rather than a manual scanning or user requested process. As will be understood by one of skill in the art, the continuously updated engines and definitions refer to the fact that the antivirus engines are updated periodically as new viruses become identified and known. The continuous updating does not require any specific interval of updating.

Antivirus engines 110-130 can be any commercially available or open source antivirus option. It will be appreciated by one of ordinary skill in the art that the antivirus options 110-130 can all operate in conjunction with each other such that the server can scan using any or all of the antivirus options available. Alternatively, only one antivirus engine can be used. Thus, any combination of one or many antivirus engines can be implemented on one or multiple machines.

The remote location can be the in the so called "clouds," meaning on a server coupled to the user's machine by the internet. The remote location can also be coupled to the user's machine by a way of an intranet. For example, embodiments of the present invention can be used in a corporate setting where the server 100 scans all the applications used by the employees and makes use of hash database 140 to determine which employee(s) are infected with a virus.

Figure 2:
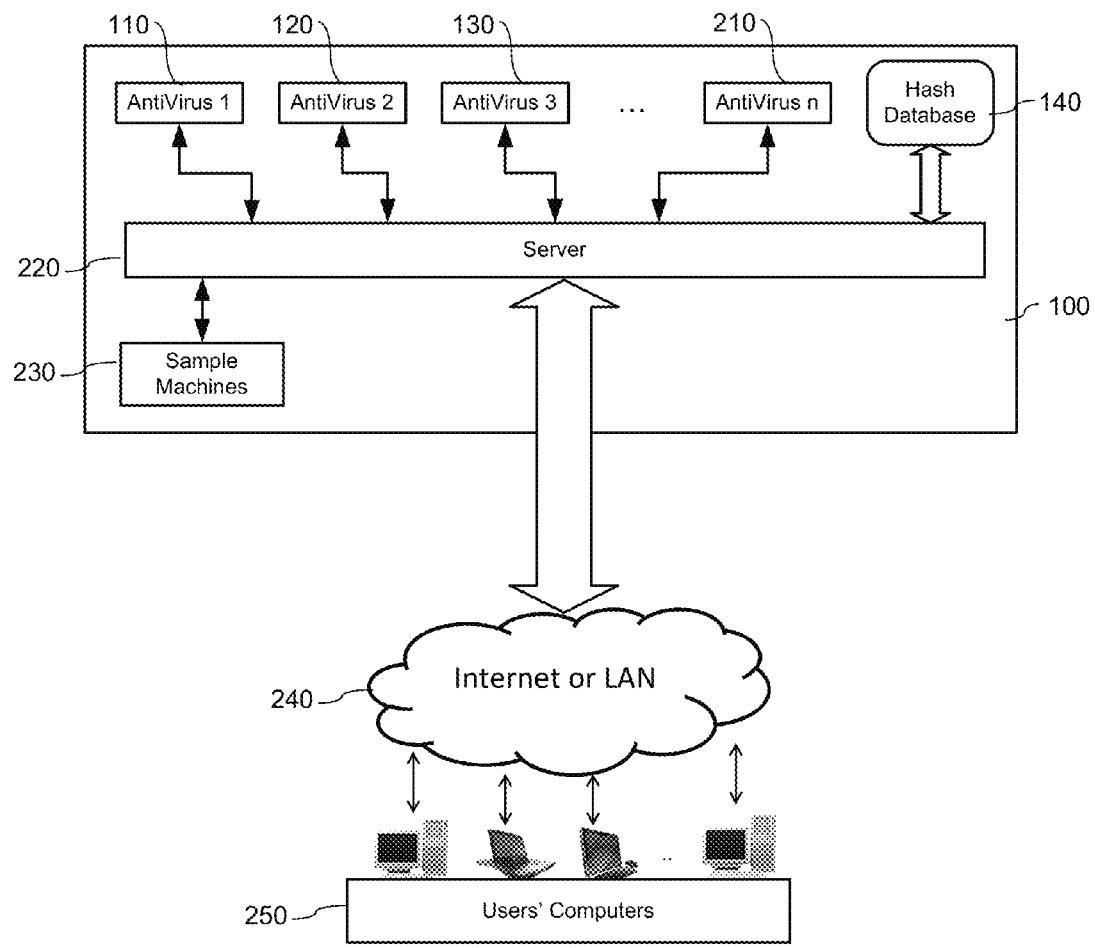
FIG. 2 shows a block diagram of a system of an antivirus system and its interaction with the user machine, in accordance with various aspects of the present invention.

FIG. 2 shows a block diagram of a system of an antivirus system and its interaction with the user machine, in accordance with various aspects of the present invention. FIG. 2 shows some components of FIG. 1, for example, the antivirus engines 110-130 and shows that there can be any number antivirus engines by showing antivirus n 210. FIG. 2 also shows hash database 140. FIG. 2 shows server 220 and sample machines 230. Sample machines 230 indicate that there may be multiple machines used to host the programs on the server. Sample machines are used to upload commonly used application binaries without needing to collect them from user's machines and overloading network bandwidth.

FIG. 2 also shows an interface between server 100 and the internet or a local area network (LAN) 240. The internet or LAN 240 is coupled to the user's computers 250. As depicted in FIG. 2, the user computers can be a desktop personal computer, or a laptop computer. Furthermore, the user computer can be a smart phone, a tablet or a network security device. A network security device includes an intrusion prevention system, unified threat management (UTM) or any other network security device designed to prevent a virus from attacking a network.

The user has various software applications or programs on its computers 250. In one embodiment of the present invention, the user also installs an application as part of the light weight antivirus that collects the hashes from the user computer. Those hashes are sent to the server 100 by way of the interface module 150. In the embodiment shown in FIG. 2, the hashes are sent by through the internet or LAN to the server 100. The actual program code may also be sent to the server 100 in case the program code is not found on the server.

Server 100 stores all the applications or programs that exist on any of its user computers. Server 100 can therefore scan for viruses using antivirus 1 110, antivirus 2 120, antivirus 3 130, and so on up to antivirus n 210. Therefore, the user can gain the benefit of many different antivirus options. Some antivirus options are better at detecting one virus while others are better at detecting other viruses. Also, the user can gain the benefit of more complete antivirus scanning without having to use computing resources on running an antivirus option. Furthermore, the user does not have to pay for multiple antivirus options.

In one embodiment, the user computers 250 can send a message to the interface module 150 of server 100 when the user installs a new program as detected by the light weight antivirus. The server can then scan the new program using antivirus 1 110-antivirus n 210 and can send a message to the user computer 250 by way of interface module 150 indicating whether the new program contains a known virus. If a virus is detected, the user can make a real time decision about whether to install the new program and can, in fact, choose not to install the new program.

In one embodiment where the user computers are not connected to the server, the light weight antivirus can take on the role of scanning new program installed for viruses while ignoring all other programs that have been certified by server 100 as virus-free previously. This gives rise to a highly efficient antivirus solution for the user machine regardless of network connectivity.

In one embodiment, a virus is detected and the server 100 sends a message by way of interface module 150 to the user computers 250 indicating that a virus was detected. The server 100 can also recommend a course of action to eliminate the virus without adversely affected operation of the user computers 250.

Figure 3:
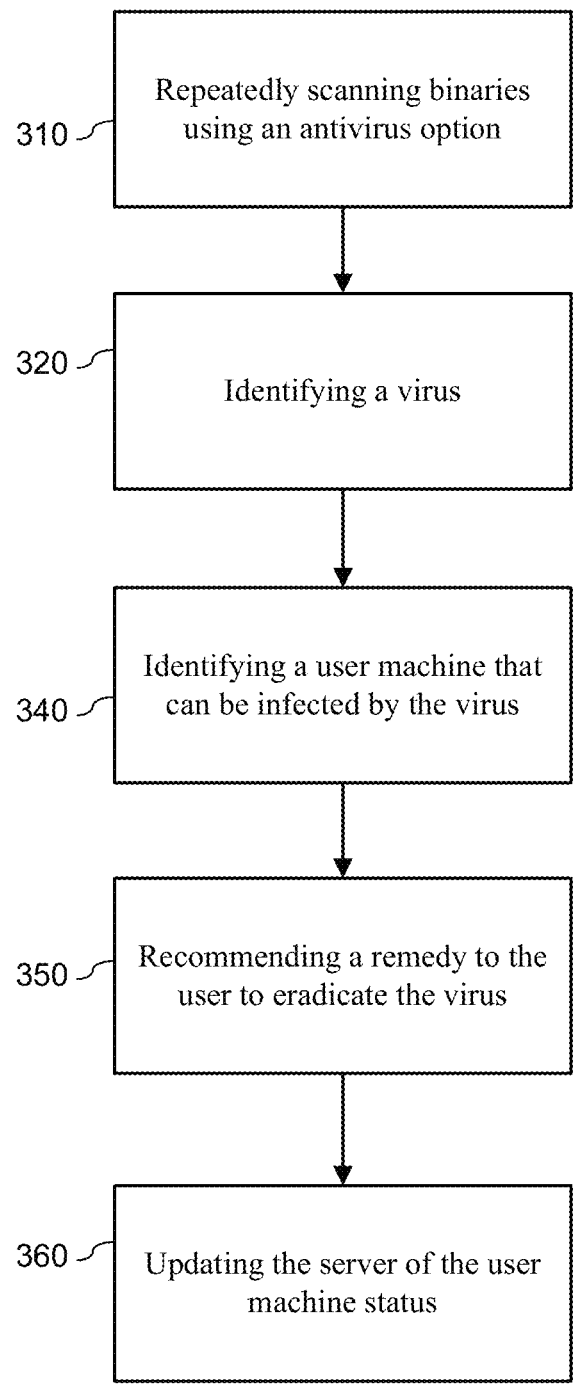
FIG. 3 shows a flowchart of an antivirus method, in accordance with various aspects of the present invention.

FIG. 3 shows a flowchart of an antivirus method, in accordance with various aspects of the present invention. FIG. 3 shows repeatedly scanning binaries using an antivirus option 310. As described above, the repeated scanning 310 occurs remotely in server 100 and can occur using one or more or all known antivirus options. As described above, the antivirus options can be continuously updated and contain continuously updated definitions.

FIG. 3 also shows identifying a virus 320. The identifying a virus 320 is accomplished by one or more the antivirus engines 110-130. FIG. 3 also shows identifying a user machine that can be infected by the virus 340. The identifying the user machine that has been infected by a virus 340 is determined using the hash database 140. The hash database 140 keeps track of which hashes are associated with programs on each user machine. Therefore, using the hash database 140, the server 100 can identify which user machine is infected by the virus 340.

FIG. 3 also shows recommending a remedy to the user to eradicate the virus 350. The recommending a remedy 350 is accomplished using interface module 150. Interface module 150 can send a message to the user machine 250 indicating a recommended remedy. FIG. 3 also shows updating the server of the user machine status 360. The updating is accomplished by way of a light weight antivirus running on the user machine 250 to identify and communicate the hashes to the server 100.

Figure 4:
FIG. 4 shows one embodiment of a user interface, in accordance with various aspects of the present invention.

FIG. 4 shows one embodiment of a user interface, in accordance with various aspects of the present invention. FIG. 4 is one example of a user interface 400 that can be used on a user machine 250 to communicate the presence of a virus in a user machine 250. FIG. 4 also shows the recommended remedy in form of several options available to the user, for example, quarantine, remove or allow. FIG. 4 also shows the antivirus option used and the result for the particular virus threat. The user can then select an option, which will then be communicated to the server 100.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

I claim:

1. A method for antivirus protection, the method performed on a server, comprising:
storing, by the server, copies of all applications resided on a user machine associated with the server;
receiving, by the server, a hash from the user machine, the hash indicating an application that is stored on the user machine, the server initialization is triggered by associating a new user machine with the server and is triggered by installing a new application on the user machine;
storing a copy of the application that resides on the user machine, the copy of the application is stored on the server as binaries and the copy of the application is used to detect a virus on the user machine without using computing resources on the user machine;
automatically and periodically scanning the binaries stored on the server using an antivirus option with a continuously updated engine and virus definition, wherein the scanning binaries occurs entirely remotely from the user machine and wherein the periodic scanning is triggered by the continuously updated engine and virus definition such that when the engine and virus definition is updated the repeated scan occurs without requiring communication with the user machine to repeatedly send information related to the application to the server since the copy of information and the application is stored on the server and without requiring communication with the user machine while the server is performing virus detection; and
identifying a virus based on the scanning of the binaries on the server;
identifying the user machine that has been infected by the virus, the identification of the user machine using a process executing on the server;
recommending a remedy to the user to eradicate the virus, wherein the remedy is selected from the list of quarantine and remove the virus; and
updating the server with the user machine status.

2. The method of claim 1, wherein the identifying a user machine that has been infected by the virus further comprises:
using a database of hashes, applications, and a unique user machine identifier; and
regularly updating database of hashes of applications on user machine.

3. The method of claim 1, wherein the scanning identifies all virus-free programs on the user machine with information from the server and a local antivirus application stored on the user machine scans only newly installed program.

4. The method of claim 1, wherein the scanning the binaries is accomplished using a plurality of antivirus options.

5. The method of claim 1, wherein the user machine is a smart phone.

6. The method of claim 1, wherein the user machine is a tablet.

7. The method of claim 1, wherein the user machine is a network security device.

8. The method of claim 1, wherein the method for antivirus protection is used in a corporate network setting.

9. The method of claim 1 wherein the user machine is powered off.

10. A system for remote antivirus protection using a server remote from a user machine, comprising:
a non-transitory memory storing a copy of an application that resides on the user machine and a hash database of at least one hash and program corresponding to the at least one program on the user machine and the hash database is updated in response to information received regarding detection of a newly installed application on the user machine, the copy of the application is stored on the server as binaries and the copy of the application is used to detect a virus on the user machine without using computing resources on the user machine;
an antivirus engine, coupled to the hash database, executing on the server to enable the server to automatically and periodically scan the binaries on the server for a virus using continuously updated engines and virus definitions machine and wherein the periodic scanning is triggered by the continuously updated engine and virus definition such that when the engine and virus definition is updated the repeated scan occurs without requiring communication with the user machine to repeatedly send information related to the application to the server since the copy of information and the application is stored on the server and without requiring communication with the user machine while the server is performing virus detection; and
an interface module component of the server, coupled to the hash database, executing on the server to enable the server to receive information from a remotely located user machine regarding a hash and machine status upon detection of a newly installed or newly deleted application on the user machine and to update the hash database accordingly and to send information regarding a virus to the user machine.

11. The system of claim 10, wherein the antivirus engine is a commercially available antivirus option.

12. The system of claim 10, wherein the antivirus engine is an open source antivirus option.

13. The system of claim 10, further comprising a user machine having a local antivirus application stored on the user machine for detecting a newly installed program and sending it for on-demand scanning remotely.

14. The system of claim 10, wherein the antivirus engine identifies all virus-free programs on a user machine and a local antivirus application stored on the user machine scans a newly installed program.

15. The system of claim 10, wherein the antivirus engine uses a plurality of antivirus options.

16. The system of claim 10, wherein the system is used in a corporate network setting.

17. The system of claim 10, wherein the user machine is powered off.

* * * * *